United States Patent

Ahlnäs

Patent Number: 5,451,243
Date of Patent: Sep. 19, 1995

[54] CONTROLLED-RELEASE FERTILIZER COMPOSITION IN THE FORM OF A PASTE

[75] Inventor: Thomas Ahlnäs, Helsinki, Finland

[73] Assignee: Kemira Oy, Finland

[21] Appl. No.: 178,276

[22] PCT Filed: Jul. 3, 1992

[86] PCT No.: PCT/FI92/00207
§ 371 Date: Dec. 27, 1993
§ 102(e) Date: Dec. 27, 1993

[87] PCT Pub. No.: WO93/01150
PCT Pub. Date: Jan. 21, 1993

[30] Foreign Application Priority Data
Jul. 4, 1991 [FI] Finland .................... 913257

[51] Int. Cl.$^6$ ............................................. C05G 5/00
[52] U.S. Cl. .................................. 71/64.09; 71/64.11
[58] Field of Search .................. 71/64.09, 64.11, 903

[56] References Cited

U.S. PATENT DOCUMENTS

| | | |
|---|---|---|
| T969,003 | 4/1978 | Phillips, Jr. et al. |
| 3,192,030 | 6/1965 | Mills et al. |
| 4,345,931 | 8/1982 | Meyer ........................ 71/64.09 |
| 4,997,642 | 3/1991 | Curtis et al. ................. 71/64.09 |

FOREIGN PATENT DOCUMENTS

| | | | |
|---|---|---|---|
| 0059027 | 9/1982 | European Pat. Off. | C05G 3/00 |
| 0081008 | 6/1983 | European Pat. Off. | C05G 3/00 |
| 51-114260 | 10/1976 | Japan | C05G 3/00 |
| 1153587 | 6/1989 | Japan | C05G 5/00 |

Primary Examiner—Wayne Langel
Attorney, Agent, or Firm—Pennie & Edmonds

[57] ABSTRACT

A fertilizer controllably affecting composition which is easy to handle and which has enormous ability to transfer nitrogen to plant organism and improve the growth, has now been invented by including into it 30–90% by weight of a compound containing plant nutrients, 6–50% by weight of water, 2–20% by weight of oil and 2–25% by weight of water-in-oil type (w/o) surfactant, whereby the composition is in the form of a stable paste or an emulsion slurry.

11 Claims, No Drawings

CONTROLLED-RELEASE FERTILIZER COMPOSITION IN THE FORM OF A PASTE

FIELD OF THE INVENTION

This invention relates to the controllably affecting fertilizer composition which as a mixture contains plant nutrients, water, oil and w/o type surfactant. The invention also relates to the use of such a fertilizer mixture by adding it to the soil.

BACKGROUND OF THE INVENTION

In the field there is a well known problem which is due to fertilizing soil with large amounts of plant nutrient. In that case the nutrient may dissolve into the soil at a rate which is too fast compared to the rate at which the nutrient is absorbed into the plants and improve their growth. Too high a solubility can lead to the leaching of large amounts of nutrient away from the roots or to the damage of plants due to overdosing of nutrient. One has tried to overcome the above disadvantages either by reducing the solubility of nutrients and/or by using barrier layers or coatings.

One way to bring about a slowly soluble fertilizer is to prepare an emulsion which has a non-hygroscopic component evenly surrounding the nutrient and preventing the nutrient from dissolving too early into the soil. The U.S. Pat. No. 3,192,030 discloses the mixing of solid nutrient to a so-called water-in-oil emulsion (w/o emulsion), the oil phase of which consists of an organic solution containing wax and the water phase of which consists of pure water. According the publication the formulation turns into solid, wax coated nutrient in the soil after the water and the organic liquid have evaporated, and the nutrient is slowly released to be exploited by the plants.

The U.S. defensive publication T969,003 discloses an emulsion composition which consists of a liquid plant nutrient, an organic solvent which is insoluble in water and w/o type surfactant. The mixture consists of about 13–26% by weight of fertilizer, about 60–81% by weight of water, about 4–13% by weight of oil and about 0.2–1.4% by weight of w/o type surfactant (examples 4, 6 and 7). The formulation thus concerns liquid fertilizer compositions where the plant nutrient is dissolved in a large quantity of water. The amount of fertilizer is very large and difficult to handle considering its nutritive value, and besides, it's use depends on transportation, treatment and spreading equipments of the liquid.

It is evident that although the arrangement of the U.S. publication T969,003 has many advantages e.g. its small number of components, it contains limitations concerning the handling and choosing of raw materials.

SUMMARY OF THE INVENTION

The purpose of the present invention is to produce a fertilizer composition, the nutrient of which is controllably affecting. Further a composition is strived for which is affecting controllably when using the most important plant nutritives, and for the raw material of which also nutrient salts compositions, which clog the common fertilizers, are suitable. One goal is also a fertilizer composition in the preparation, handling, and spreading of which equipments available can be utilized. Furthermore, an aim is also a mixture, the nutrient of which is better absorbed into the plants and improve their growth.

DETAILED DESCRIPTION OF THE INVENTION

The objectives mentioned before have now been achieved with the new controllably affecting fertilizer composition, which is mainly characterized in that it is in the form of a paste, containing 30–86% by weight of a compound containing nutrient, 10–50% by weight of water, 2–20% by weight of oil and 2–25% by weight of water-in-oil type (w/o type) surfactant.

Surprisingly, it has been noticed that the new fertilizer composition mentioned above improves the maximal nitrogen intake of plants and so makes an extreme plant growth possible. The fertilizer composition in question also operates better with common amounts of fertilizer compared to a fertilizer composition without an emulgator.

Another advantage of present invention is that the fertilizer composition which is in the form of a paste and is addable as such into the soil without large quantities of water or without having to mix it into large quantities of water (see U.S. T969,003), before spreading it into the soil.

The compound containing plant nutrients used in this invention is preferably a fertilizer raw material which together with the water component of the fertilizer composition forms a mixture which is near the saturation point or preferably above it. In the last mentioned case, the water phase of the fertilizer composition contains a compound containing plant nutrients or a precursor thereof also in the form of crystals. A compound containing solid plant nutrient can also be suspended in the oil phase or in the interlayer between the oil/water phase layers.

Another advantage of the fertilizer composition according to the invention is that the w/o type emulsion structure is preserved independent of the temperature and even after freezing.

N, P and K are the three most important plant nutrients.

The compound containing plant nutrients used in the fertilizer composition can be any known fertilizer raw material known in the field. According to one preferred embodiment the nutrient is based on the cations $NH_4^+$, $K^+$, $Ca^+$, $Mg^+$, the anions $NO_3^-$, $Cl^-$, $SO_4^-$, the phosphates, the polyphosphates, and/or urea and/or trace fertilizers. In addition to urea, as concrete compounds ammoniun nitrate, the ammonium phosphates, for example diammonium phosphate DAP, potassium chloride, the super phosphates and the alkaline-earth metal oxides are mentioned.

According to one preferred embodiment the controllably affecting soluble mixed fertilizer contains about 60–80% by weight of the compound containing nutrient. On the other hand, it is advantageous if the water content of the fertilizer composition is about 10–30% by weight.

The oil component used in the controllably affecting fertilizer composition according to the invention preferably is a non-phytotoxic oil and most preferably vegetable oil such as rape, soya, sunflower, palm, cocos, corn, turnip rape, tall or mineral oil or a mixture of these oils. The oil content is preferably about 6–12% of the weight of the controllably affecting fertilizer composition.

The quantity and quality of w/o type surfactant decisively affects the usefulness of the fertilizer composition of the present invention. The surfactant mentioned is preferably an ester of a polyol and a fatty acid or a derivative thereof, ester, like an oil or fatty monoglyceride. The other w/o type surfactants are propylene glycol monostearate, glycerol monooleate, diglycerine sesquioleate, sorbitane sesquioleate, glycerol monostearate, acetylated monoglyceride (stearate), dekaglycerol octaoleate, diethylene glycol monostearate, sorbitane monooleate, propylene glycol monolaurate, sorbitane monostearate, polyoxyethylene fatty alcohol ether, lecitine and lignosulphonate. The surfactant can also be a mixture of emulgators.

Important properties of the surfactant are its ability to form a w/o type emulsion and its poor solubility in water. The fertilizer composition according to the present invention contains preferably 6–12% by weight w/o type surfactant.

According to a preferred view of the invention the relation between the compound containing nutrient, water, oil and w/o type surfactant or the mixture of emulgators is such that the surfactant forms an organized and probably a multilayer structure, like a liquid crystal layer, on the surface of the phase formed by the water and the compound containing plant nutrient.

Nitrification inhibitors, slowly soluble or decomposing plant nutrient components, plant growth stimulating components, plant-protecting agents, plant stimulants, plant hormones and/or soil conditioner components can also be added to the fertilizer composition.

As mentioned before, the fertilizer composition in the form of a paste or an emulsion slurry is preferably used as a fertilizer by adding it as such i.e. in the form of a paste or an emulsion to the soil. Hereby the advantage is that in the spreading of the fertilizer the store rooms, transportation and spreading equipments of manure already existing in the farms can be utilized.

In the following some performance examples are presented the sole aim of which is to illustrate the present invention.

The examples 1–7 describe the preparation of fertilizer compositions. The examples 8–16 describe the growth tests performed by the aid of the fertilizers in vessels. The example 17 describes the soil tests performed with the fertilizer compositions prepared in the examples 2–7.

All the percentages are percentages by weight unless otherwise mentioned. The abbreviation DAP is used about diammonium phosphate. The nutrient content of the fertilizers is abbreviated regardless of the well compounds, for example (N-P-K) 10-15-12+2.0 Ca means that there is 10% of nitrogen, 15% of phosphorus counted as $P_2O_5$, 12% of potassium counted as $K_2O$ and 2% of calcium. The freezing/melting test was positive if the emulsion was preserved after freezing and melting.

EXAMPLE 1

The Preparation of the Fertilizer Composition 20 g of water and 70 g of dry powdered fertilizer, which has the nitrogen, phosphorous and potassium rate 15-15-15 are mixed at 80° C. 10 g of rape oil and 10 g of surfactant which is a mixture of Dimodan LS (monoglyceride of sun flower oil, which contains over 90% monoester) and Dimodan PM (monoglyceride of animal fat, which contains over 90% monoester). The mixture is warmed to about 60° C. After that the inorganic and organic part are emulsified with an emulsifier like UltraTurrax or Bamix blender. The product is pasty and the paste is thermostable.

EXAMPLES 2–7

The Preparation of the Fertilizer Composition

The emulsified fertilizers were produced so that at first raw slurries were made from different nutrient salts by mixing them with small amounts of water and by warming them to a homogeneous solution or slurry. After that MgO and CaO were added and mixed. The raw slurries were produced according to Table 1.

TABLE 1

| Example | Material | Nutrient | Humidity, % |
|---------|----------|----------|-------------|
| 2 | Urea, DAP, Water | 39.1–4.7–0 | 19 |
| 3 | Urea, DAP, KCl, Water | 32.9–4.0–7.9 | 16 |
| 4 | Urea, DAP, KCl, Water | 30.7–4.9–8.6 | 18.5 |
| 5 | Urea, DAP, Water, MgO, CaO | 30.2–3.6–0 +5.0 mg +10.0 Ca | 24 |
| 6 | Urea, DAP, KCl, Water, MgO, CaO | 25.5–3.0–6.1 +5.0 Mg +10.0 Ca | 16.7 |
| 7 | Urea, DAP, KCl, Water, MgO, CaO | 25.1–4.0–7.0 +4.1 Mg +8.2 Ca | 15.2 |

The emulsions were prepared by mixing to the warm raw slurry the emulgator Dimodan LS and turnip rape oil and emulsifying with a laboratory blender. The more exact ratios of mixture are presented in the following table (quantities in grams). The emulsions were allowed to cool at room temperature and visual examination was performed. The results are given in Table 2.

TABLE 2

| | Example | | | | | |
|---|---|---|---|---|---|---|
| | 2 | 3 | 4 | 5 | 6 | 7 |
| Raw slurry, g | 370 | 370 | 180 | 180 | 180 | 180 |
| Additional water, g | 5 | — | 33 | — | — | 30 |
| Oil, g | 30 | 60 | 30 | 10 | 15 | 15 |
| Emulgator, g | 30 | 60 | 30 | 10 | 15 | 15 |
| Emulgation temperature, °C. | 75 | 75 | 30 | 65 | 50 | 65 |
| Product: | | | | | | |
| N, % | 28.1 | 21.8 | 17.4 | 21.6 | 16.6 | 17.3 |
| $P_2O_5$, % | 8.7 | 6.8 | 7.2 | 6.7 | 5.2 | 7.1 |
| $K_2O$, % | — | 6.3 | 5.8 | — | 4.8 | 5.8 |
| Mg, % | — | — | — | 3.4 | 5.4 | 2.7 |
| Ca, % | — | — | — | 7.0 | 3.7 | 5.5 |
| Oil, % | 6.9 | 12.2 | 11.0 | 5.0 | 12.5 | 6.3 |
| Emulgator, % | 6.9 | 12.2 | 11.0 | 5.0 | 12.5 | 6.3 |
| Water, % | 17.3 | 12.1 | 24.3 | 21.6 | 12.5 | 22.0 |
| Freezing/melting test | + | + | + | + | + | + |
| Physical state, 20° C. | Example 2: Stiff, crumble | | | | | |

TABLE 2-continued

| | Example | | | | | |
|---|---|---|---|---|---|---|
| | 2 | 3 | 4 | 5 | 6 | 7 |

Example 3: Pasty
Example 4: Viscous, oily
Example 5: Stiff, grainy
Example 6: Viscous, creamy
Example 7: Viscous, creamy

EXAMPLES 8-14

The Growth Test in Vessels

To 7 liters incubation vessels were transferred 3 liters of dry silt soil, which had been fertilized with the following fertilizers:

| Example | Fertilizer |
|---|---|
| 8 | None |
| 9 | PK fertilizer: $P_2O_5$ 60 and $K_2O$ 150 mg/kg of dry soil |
| 10 | Calcium ammonium nitrate (CAN) + PK fertilizer: N 300, $P_2O_5$ 60 and $K_2O$ 150 mg/kg of dry soil |
| 11 | Paste, N 300, $P_2O_5$ 480 and $K_2O$ 510 mg/kg of dry soil |
| 12 | Paste, N 1000, $P_2O_5$ 1600 and $K_2O$ 1700 mg/kg of dry soil |
| 13 | Mixture, N 300, $P_2O_5$ 480 and $K_2O$ 510 mg/kg of dry soil |
| 14 | Mixture, N 1000, $P_2O_5$ 1600 and $K_2O$ 1700 mg/kg of dry soil |

The "paste" is an emulsion suspension according to the present invention. As raw material was used 280 kg of milled powder from a fertilizer having the composition 10-16-17+2 Mg+0.8 Ca, which was slurried in 70 liters of water. As emulgator was used a 1:1 mixture of 33 kg of Dimodan LS and Dimodan PM and as the oil component 33 kg of soya oil. The "mixture" consisted of the same fertilizer powder without emulgator and oil.

Rye-grass was grown in the vessels. The result of the growth was estimated by weighing the grass cut after four weeks and again after seven weeks from planting. The nitrogen contents of the samples were analysed. The results are described in Table 3:

TABLE 3

| | | Nitrogen yield, mg N/vessel | |
|---|---|---|---|
| Vessel | Fertilizer | Yield 1 | Yield 2 |
| 8 reference | — | 35 | 13 |
| 9 reference | PK | 32 | 9.2 |
| 10 reference | CAN + PK, 300 mg N | 537 | 181 |
| 11 | Paste, 300 mg N | 475 | 78 |
| 12 | Paste, 1000 mg N | 778 | 685 |
| 13 reference | Mixture, 300 mg N | 557 | 101 |
| 14 reference | Mixture, 1000 mg N | 55 | 147 |

The reference tests 8 and 9 indicate that the growth restrictive factor is nitrogen. It has been found out that with the amount of fertilizer of 300 mg N/kg of dry soil the results are the same both with the new emulsion fertilizers and with the conventional mixed fertilizers. With a portion of 1000 mg N/kg dry soil the fertilizer composition (vessel 14) was inconvenient high for grass, but however, when using the emulsion suspension fertilizer according to the present invention (vessel 12) the growth of grass was excellent and a clearly higher nitrogen yield was achieved.

EXAMPLE 15: The Soil Test

The fertilizers prepared according to examples 2-7 were examined by the aid of a "soil test" as follows: to 240 g of sand, the moisture of which was 20%, was mixed fertilizer so that the dosage of nitrogen became 60 g. The vessels were kept in a weatherometer in a relative humidity of 60% and to the vessels was added occasionally watering water in an amount corresponding to that of the evaporated water. After the test time the humidity of the soil was measured. 20 g of dry drawn soil was slurried as damp in 50 ml of 0.1M KCl solution mixed for 5 min in an ultrasonicator and filtered. Ammonium and nitrate were analysed from the filtrate as mean value of three parallel samples. The results in Table 4 are given in the unit mg N/kg of dry drawn soil.

TABLE 4

| | Comparison | Example | | | | | |
|---|---|---|---|---|---|---|---|
| | | 2 | 3 | 4 | 5 | 6 | 7 |
| 4d | | | | | | | |
| $NH_4$ | 127 | 185 | 196 | 170 | 157 | 161 | 175 |
| $NO_3$ | 235 | 30 | 28 | 31 | 26 | 25 | 27 |
| 8d | | | | | | | |
| $NH_4$ | 62 | 122 | 107 | 105 | 124 | 60 | 115 |
| $NO_3$ | 188 | 88 | 73 | 71 | 98 | 53 | 84 |

The results show that the solubility of the nutrients of the fertilizers according to the present invention is slower than that of the comparison fertilizers, and when the fertilizers according to the present invention are used the formation of nitrate nitrogen is remarkably less than when the comparison fertilizers were used.

EXAMPLES 16-21

The Preparation of the Fertilizer Composition with Different Types of Emulgators Preparing tests of the fertilizer composition were made so that 100 mg of 15-15-15 fertilizer was mixed with 25 g of water at 70° C. and emulsified in 20 g of a 1:1 mixture of turnip rape oil and emulgator at the temperature of 40° C. The dissolving rate of the nutrients was measured by the increase of the conductivity as a function of time in a vessel containing 3 g of fertilizer sank in 90 ml of a 0.01 M aqueous solution of $CaCl_2$.

TABLE 5

| | | Conductivity, mS/cm | | | | |
|---|---|---|---|---|---|---|
| Example | Emulgator | 1 h | 22 h | 60 h | 94 h | 270 h |
| 16 | Panodan | 2.6 | 4.1 | — | — | 15.4 |
| 17 | Soya lecitine | 2.3 | 4.8 | — | — | 21.4 |
| 18 | Lignosulphate | 2.6 | 6.0 | 12.5 | — | — |
| 19 | Dimodan LS + soya lecitine | 1.1 | 2.9 | (10) | 14.2 | — |
| 20 | Reference: fertilizer 15—15—15 | 2.6 | 16.0 | 25.0 | — | — |
| 21 | Reference: 0.01M $CaCl_2$ | 2.1 | 2.1 | 2.1 | 2.1 | 2.1 |

Panodan is the ester of monoglyceride and diacetyl wine acid. The pastes were creamy and stable during freezing tests. The results indicate that fertilizers according to the present invention became remarkably slowlier waterlogged than the reference fertilizer.

EXAMPLES 22-40

Pasty Fertilizer Compositions Contain Tall Oil

TABLE 6

Tall oil (raw or various fractions) together with monoglyceride

| | Exp. No. | | | |
|---|---|---|---|---|
| | 22 | 23 | 24 | 25 |
| Composition (weight fraction) (15—15—15*) | 100 | 100 | 100 | 100 |
| water | 25 | 25 | 25 | 25 |
| Oulu 120 | 10 | — | — | — |
| Oulu 163 | — | 10 | — | — |
| Oulu raw tall oil | — | — | 10 | — |
| Oulu 125/130 | — | — | — | 10 |
| Dimodan LS | 10 | 10 | 10 | 10 |
| Conductivity test** | + | + | + | + |
| Freezing test | ( . . . not tested . . . ) | | | |

TABLE 7

Tall oil Oulu 120 together with various kinds of emulgators

| | Test No. | | | | | |
|---|---|---|---|---|---|---|
| | 26 | 27 | 28 | 29 | 30 | 31 |
| Composition (weight fractions) 15—15—15* | 100 | 100 | 100 | 100 | 100 | 100 |
| water | 25 | 25 | 25 | 25 | 25 | 25 |
| Oulu 120 | 10 | 10 | 10 | 10 | 10 | 10 |
| Soya lecitine 1# | 10 | — | — | — | — | 5 |
| Soya lecitine 2# | — | 10 | — | — | — | — |
| Panodan TR | — | — | 10 | — | — | — |
| Dimodan CP | — | — | — | 10 | — | — |
| Dimodan PM | — | — | — | — | 10 | — |
| Dimodan LS | — | — | — | — | — | 5 |
| Conductivity test** | + | + | + | + | + | + |
| Freezing test $ | | + | + | + | + | + |

TABLE 8

Tall oil Oulu 120 together with various kinds of emulgators

| | Test No. | | | | | |
|---|---|---|---|---|---|---|
| | 32 | 33 | 34 | 35 | 36 | 37 |
| Composition (weight fractions) 15—15—15* | 100 | 100 | 100 | 100 | 100 | 100 |
| water | 25 | 25 | 25 | 25 | 25 | 25 |
| Oulu 163 | 10 | 10 | 10 | 10 | 10 | 10 |
| Soya lecitine 1# | 10 | — | — | — | — | 5 |
| Soya lecitine 2# | — | 10 | — | — | — | — |
| Panodan TR | — | — | 10 | — | — | — |
| Dimodan CP | — | — | — | 10 | — | 5 |
| Dimodan PM | — | — | — | — | 10 | — |
| Conductivity test** | + | + | + | + | + | + |
| Freezing test $ | + | + | +(o) | + | + | |

TABLE 9

Raw tall oil together with various kinds of emulgators

| | Test No. | | | | | |
|---|---|---|---|---|---|---|
| | 38 | 39 | 40 | 41 | 42 | 43 |
| Composition (weight fractions) 15—15—15* | 100 | 100 | 100 | 100 | 100 | 100 |
| water | 25 | 25 | 25 | 25 | 25 | 25 |
| Raw tall oil | 10 | 10 | 10 | 10 | 10 | 10 |
| Soya lecitine 1# | 10 | — | — | — | — | 5 |
| Soya lecitine 2# | — | 10 | — | — | — | — |
| Panodan TR | — | — | 10 | — | — | — |
| Dimodan CP | — | — | — | 10 | — | 5 |
| Dimodan PM | — | — | — | — | 10 | — |
| Conductivity test** | + | + | + | + | + | + |
| Freezing test $ | + | + | +(o) | + | + | + |

TABLE 10

Oulu 125/130 together with various kinds of emulgators

| | Test No. | | | | | |
|---|---|---|---|---|---|---|
| | 44 | 45 | 46 | 47 | 48 | 49 |
| Composition (weight fractions) 15—15—15* | 100 | 100 | 100 | 100 | 100 | 100 |
| water | 25 | 25 | 25 | 25 | 25 | 25 |
| Oulu 125/130 | 10 | 10 | 10 | 10 | 10 | 10 |
| Soya lecitine 1# | 10 | — | — | — | — | 5 |
| Soya lecitine 2# | — | 10 | — | — | — | — |
| Panodan TR | — | — | 10 | — | — | — |
| Dimodan CP | — | — | — | 10 | — | 5 |
| Dimodan PM | — | — | — | — | 10 | — |
| Conductivity test** | + | + | + | + | + | + |
| Freezing test $ | + | + | +(O) | + | + | + |

**conductivity test: + = at least about the time of 150 hours lapses before the conductivity is balanced in water solution
$ freezing test: + = the physical state stays unchangeable
+(o) = a little oil emerges to the surface Dimodan LS and PM, see example 1
Dimodan CP is a plant oil monoglyceride containing at least 90% of monoester.

I claim:
1. A controlled-release fertilizer composition, comprising as a mixture plant nutrients, water, oil, w/o type surfactant, characterized in that said composition is in the form of a paste containing 30–86% by weight of a compound containing water-soluble plant nutrients, 10–30% by weight of water, 2–20% by weight of oil, and 2–25% by weight w/o type surfactant.

2. The controlled-release fertilizer composition according to claim 1, characterized in that said composition contains about 60–80% by weight said compound containing plant nutrients.

3. The controlled-release fertilizer composition according to claim 1, characterized in that it contains about 6–12% by weight of oil.

4. The controlled-release fertilizer composition according to claim 1, characterized in that said composition contains about 6–12% by weight of w/o type surfactant.

5. The controlled-release fertilizer composition according to claim 1, characterized in that the compound containing nutrients is a raw material of a fertilizer, which together with the water component of the fertilizer composition forms a mixture which is near or above the saturation point.

6. The controlled-release fertilizer composition according to claim 1, characterized in that the plant nutrient is based on the cations $NH_4^+$, $K^+$, $Ca^+$, $Mg^+$,; the anions $NO_3^-$, $Cl^-$, $SO_4^{2-}$; the phosphates, the polyphosphates, and/or urea, and/or trace nutrients.

7. The controlled-release fertilizer composition according to claim 1, characterized in that the oil is selected from the following oils: rape, soya, sunflower, palm, cocoa, corn, turnip, rape, tall, or mineral oil or a mixture of these oils.

8. The controlled-release fertilizer composition according to claim 1, characterized in that the w/o type surfactant is the ester of a polyol and a fatty acid or a derivative thereof, lecithin, or lignosulphonate.

9. The controlled-release fertilizer composition according to claim 1, characterized in that said composition contains nitrification inhibitors, slowly-soluble nutrient components, plant-protecting agents, plant stimulants, plant hormones, or soil conditioner components.

10. The use of the controlled-release fertilizer composition according to any one of claims 1–9 as a fertilizer by adding said composition to the soil in the form of a paste.

11. The method of fertilizing plants growing in soil comprising forming a controlled-release fertilizer composition having as a mixture plant nutrients, water, oil, and w/o type surfactant in the form of a paste containing 30–86% by weight of a compound containing water-soluble plant nutrients, 10–30% by weight of water, 2–20% by weight of oil, and 2–25% by weight w/o type surfactant; and adding said fertilizer composition to the soil in the form of said paste.

* * * * *